United States Patent

Surland

[15] 3,661,619
[45] May 9, 1972

[54] PRINTING PROCESS EMPLOYING MOISTURE

[72] Inventor: Aage Surland, Brooklyn, N.Y.
[73] Assignee: Frye Industries Inc., New York, N.Y.
[22] Filed: Apr. 17, 1969
[21] Appl. No.: 817,163

[52] U.S. Cl. ............................ 117/62.2, 117/15, 117/38, 117/42, 117/155
[51] Int. Cl. ........................................ B44d 1/44, B41m 7/00
[58] Field of Search ........................ 117/15, 62.2, 38, 63, 42; 101/426

[56] References Cited

UNITED STATES PATENTS

| | | | |
|---|---|---|---|
| 2,518,607 | 8/1950 | Erickson | 117/15 |
| 2,974,058 | 3/1961 | Pihl | 117/15 |
| 2,656,327 | 10/1953 | Van Wirt et al. | 117/38 |

Primary Examiner—William D. Martin
Assistant Examiner—M. Sofocleous
Attorney—Robert E. Isner, Peter J. Franco and Spencer T. Smith

[57] ABSTRACT

A moisture setting printing process comprising the steps of printing with an ink having a vehicle comprising a glycolic soluble resin such as an acidic resin, a cross-linking agent such as hexamethylolmethyl melamine, a Lewis acid catalyst and a glycol solvent, contacting the printed ink with moisture and allowing a hardening reaction to proceed to completion.

9 Claims, No Drawings

PRINTING PROCESS EMPLOYING MOISTURE

The present invention is concerned with a process for printing and more particularly, with the process for printing, wherein the ink film is set by applying moisture thereto. The process of moisture setting of printing ink, including steam setting, water spray setting, and setting by virtue of moisture in the stock being printed, is well known. A description of the moisture-set process and moisture-set inks is set forth in the work of E.A. Apps "Ink Technology for Printers and Students" — Part II — Inks for the Major Printing Processes" published by Leonard Hill of London, 1963, pp. 136–145. Of course, there are many other disclosures of moisture-set inks and processes therefor including many patents related to the process and inks adaptable to be used therein. Generally, vehicles for moisture-set ink comprise particular types of resins dissolved in particular types of solvents. The solvents are miscible with water and the resins are essentially insoluble in water. An example of a moisture-set ink vehicle would include a maleic resin having an acid value of about 300 dissolved in a solvent such as di-ethylene glycol. The resin is soluble in the di-ethylene glycol until a certain amount of water is absorbed by the di-ethylene glycol. Once a critical minimum amount of water is absorbed by the di-ethylene glycol, the resin precipitates. In actual printing practice a very thin film of ink is printed. Part of the solvent in the ink, for example di-ethylene glycol, is immediately absorbed by the stock. When the very thin film, denuded of some of the solvent, is contacted by moisture, setting of the ink, essentially by precipitation, occurs very rapidly. In this initially set condition, the ink is still wet to the touch. Final drying occurs only after expiration of some period of time. This drying is accomplished by both evaporation and by further absorption of solvent into the absorbent stock.

There are several major disadvantages to prior art moisture-set inks and processes. Moisture-set inks generally have relatively poor wet rub resistance and poor chemical resistance. Apps (Ink Technology for Printers and Students, Part Two, Leonard Hill, London 1963) points out that "Moisture-set inks are made from resins of high acid value and generally lack resistance properties; they are readily attacked by alkalis". It has now been discovered that by employing a particular class of ink vehicles and setting these vehicles by application of moisture thereto, excellent chemical and wet-rub-resistant prints can be made on many types of stock normally printed by the conventional moisture-set process.

It is an object of the present invention to provide a novel process of printing.

It is another object of the present invention to provide a novel process of moisture-set printing.

A still further object of the present invention is to provide a novel moisture-set process of printing involving the use of particular types of ink vehicles.

Other objects and advantages will become apparent from the following description.

Generally speaking, the present invention comprises a process for printing (or coating) which includes depositing a film of ink, which ink comprises a special vehicle, causing initial precipitation of resin from the vehicle by application of moisture thereto and thereafter allowing a further permanent setting of the ink to occur. The special ink vehicle for use in the present invention comprises a water-miscible solvent such as a glycol or a glycol ether, a water-insoluble polymeric resin, a cross-linking agent from the group consisting of polymer-forming reaction products and etherated polymer-forming reaction products of formaldehyde, or other low molecular weight aldehyde, with ureas, phenol, thiourea, guanidine, melamine, ammeline, ammelide, cresols, resorcinol or the like which product or etherated product is soluble in said solvent, and an acidic catalyst. The etherated reaction product comprising the cross-linking agent is advantageously a methylated, reaction product. It is to be understood that the ink vehicle can contain mixtures of solvents, or resins or cross-linking agents as well as other materials, e.g. diluents, plasticizers and the like.

A very large number of polymeric materials can be employed in inks formulated in accordance with the foregoing. Acidic polymers operable in the process of the present invention include water-insoluble polymers of and copolymers containing acrylic acid, alpha alkyl acrylic acids, such as methacrylic acid, beta alkyl acrylic acids such as crotonic acid, other derivatives of acrylic acid such as cinnamic acid, vinyl acrylic acid, itaconic acid and others. Copolymers of the aforelisted acidic monomers and also maleic and fumaric acids can be made with vinyl esters, acrylic esters, acrylamides, styrene, styrene derivatives, butadiene and other polymerizable monomers having one or more carbon-to-carbon double bonds in their structure. Other operable polymeric or resinous materials include alkyd resins containing free carboxylic acid groups, carboxylated starch, cellulose derivatives, e.g. ethyl cellulose and natural acidic resins such as shellac. It is to be understood that the foregoing list of operable polymeric or resinous materials is not all-inclusive. Many variations, modifications and mixtures of polymeric materials are possible depending upon what characteristics are specifically desired in a specific printing ink. Generally when styrene has been mentioned, it is also intended to include homologues of styrene such as vinyl benzene and substitution products of styrene such as the various halogenated derivatives thereof. Further, in the polymeric material a certain amount of cross-linking can be employed (for example, as by including a small amount of di-vinyl benzene in styrene-containing or other vinyl resins) so long as the resultant acidic polymer is mutually soluble in a glycol or glycol ether solvent along with the cross-linking agent. Ordinarily it is advantageous to employ acidic resins having Acid Values of at least about 50. The foregoing teaching regarding Acid Number merely means that an operable polymeric material (or mixture of materials) advantageously ought to contain at least a number of labile hydrogen atoms equivalent to those present at a stated minimum Acid Number. In resinous materials such as shellac which contain both free carboxylic and hydroxyl substituents and which have a relatively low Acid Number, the hydroxyl groups contribute to both the solubility in glycol and glycol ether solvents and to the ultimate cross-linking reaction. It is possible to employ acidic resins in the form of salts provided that, under printing or drying conditions, free acidic groups (including acidic groups other than carboxylic) are regenerated.

Advantageously, the cross-linking agent employed in printing inks and coatings formulated for use in the present invention can be an etherified, initial resin-forming-reaction-product of formaldehyde with melamine, urea, thiourea or phenol. Advantageously, the etherified product is produced by reacting the initially formed alcohol with methyl alcohol under acidic conditions to form the ether. Highly advantageous results have been achieved when the cross-linking agent is polyfunctional such as in the case of hexamethoxymethyl melamine.

When cross-linking agents such as those disclosed in the preceding paragraph are employed, it is advantageous to include in the ink a small amount of an acidic catalyst, i.e., a Lewis acid. This acidic catalyst can be a mineral acid, a strong organic acid or a substance not ordinarily identified as an acid but having acidic characteristics with respect to the polymer-cross-linking-agent system. Paratoluene sulfonic acid is advantageously employed as a catalyst because, in many instances, it is mutually soluble with other ink ingredients in a suitable solvent. It is to be observed, however, that it is not always necessary to employ a catalyst. In some instances, acidic groups present on the polymeric material can act in catalytic fashion especially when such acidic groups are activated acidic groups. Activation of acidic groups can occur, for example, by positioning one or more electronegative atoms, e.g. chlorine atoms in a position alpha to a carboxylic acid group or by positioning electronegative groups (e.g. $NO_2$ groups) in a position ortho or para to a phenol substituent on a benzene ring. In other instances, especially where the polymer contains primary hydroxyl groups and hexamethoxymethyl melamine is used as the cross-linking agent, cross-linking can take place rapidly in the presence of very little catalyst.

The relative amounts of polymeric material and cross-linking agent are advantageously maintained in approximate stoichiometrical proportion, that is, the molar concentration of the labile hydrogen atoms and etherified cross-linking groups should be approximately equal in the ink vehicle. An exact stoichiometric relationship need not be maintained and substantial variation, e.g. at least plus or minus 10 percent mole percent is quite permissible. When a catalyst is used, a catalyst concentration of about 0.1 to about 3 percent (e.g. about 1 percent) based upon total weight of solids in the vehicle is usual.

From the standpoint of physical operations, the ink described hereinbefore is deposited from a printing plate of any suitable kind onto a substrate, advantageously containing an excess of moisture. Printing (including coating) can be done by letterpress, flexographic, roller coating or any alternative technique other than wet-offset. Once the ink is properly deposited, it is contacted with moisture. For example, moisture (water) present in humidified paper stock will cause resin precipitation. Less advantageous but equally operative are the applications of moisture by spray or by steam. In any event, care should be taken to allow sufficient moisture to contact the ink so that resin precipitation will result. At the same time care should be taken to avoid drowning the print with consequent distortion of the print and weakening of the substrate. After the print has been initially set by moisture, time must be allowed to achieve final set. If initial set has been carried out correctly there is no need to delay subsequent operations until final set is achieved, for example, in up to 24 hours or so. However, it must be borne in mind that the excellent chemical and wet-rub resistances achieved through the process of the present invention are not obtained until final set has occurred. It will be obvious to one skilled in the art that the inks described hereinbefore will not be operative in the wet-offset printing process. Ordinary hydrophilic fountain solutions used in this process will mix with the ink rather than maintaining or perhaps reestablishing a separate phase as required in wet-offset printing. If the fountain solution has an aqueous base, it will cause resin precipitation.

In order to give those in the art a greater understanding and appreciation of the invention, the following examples are given:

EXAMPLE I

An ink was formulated to contain the following ingredients in parts by weight:

| | |
|---|---|
| Red Lake C Pigment | 15.1 |
| Acrylic Styrene Copolymer CDX-67-3 (AV 220) | 34.1 |
| Tripropylene Glycol Methyl Ether | 41.7 |
| Hexamethoxymethyl melamine | 6.8 |
| p-Toluene Sulfonic Acid | 0.46 |
| $NH_3$ | 0.05 |
| $H_2O$ | 1.8 |

This ink was printed on a dampened paper substrate by letterpress technique. The print immediately hardened by moisture setting and exhibited excellent gloss and wet rub resistance immediately. After a short time at ambient temperature, the ink set finally to provide a wet-rub resistant, glossy print which is highly resistant to squalene a component of human perspiration which destroys most conventional moisture-set inks. CDX-67-3 is one of the class of resins described in U.S. patent application Ser. No. 467,121. This application is referred to in U.S. Pat. No. 3,308,078.

EXAMPLE II

An ink, similar to the ink employed in example I but substituting shellac for the acrylic-styrene copolymer, was printed. This ink film was immediately set by moisture and finally hardened after a short time at ambient temperature. Good wet-rub and chemical resistance was exhibited by the final hardened film.

EXAMPLE III

An ink similar to the ink of example II but employing polyethylene glycol as a solvent instead of tripropylene glycol methyl ether also immediately set upon application of moisture and finally completely hardened after a short time at ambient temperature.

EXAMPLE IV

An ink similar to the ink of example I except that dimethylolurea was employed as the cross-linking agent and hydrochloric acid was used as the catalyst was deposited in a thin film on a substrate. The ink dried substantially immediately upon application of moisture thereto.

EXAMPLE V

An ink vehicle was formulated with partially hydrolyzed polyvinylacetate as the resin, hexamethoxymethyl melamine as the cross-linking agent, paratoluene sulfonic acid as the catalyst and Dowanol tripropylene glycol methyl ether as the solvent. A thin film of the ink vehicle, set substantially instantaneously upon contact with moisture, rapidly achieved final set at room temperature and exhibited excellent wet-rub resistance.

EXAMPLE VI

An ink vehicle was formulated by dissolving ethyl cellulose in a mixture of tripropylene glycol methyl ether and cyclohexanone, adding to the solution hexamethoxymethyl melamine as a cross-linking agent and hydrocloric acid as a catalyst. This ink vehicle immediately set when a thin film thereof was contacted with moisture. The film rapidly acquired a final set at room temperature and exhibited excellent wet-rub resistance.

EXAMPLE VII

A thermosetting acrylic resin containing nitrogen sold under the trade designation Acryloid 80-51, Rohm & Haas, was dissolved in a mixture of xylol and tripropylene glycol methyl ether. To this solution was added dimethylol urea as a cross-linking agent and paratoluene sulfonic acid as a catalyst to provide an ink vehicle. Immediately upon being contacted with moisture, a thin film of the vehicle achieved an initial set and final setting occurred rapidly. The resultant film exhibited excellent wet-rub resistance.

The process of the present invention can be carried out with many other resin-solvent-cross-linking agent combinations provided that certain criteria are observed. First, the resin-solvent combination must be sufficiently moisture sensitive so as to produce an initial precipitate on contact of the film with moisture. Secondly, the resin must contain functional groups which are reactive with the cross-linking agent. In most instances, operable reactive functional groups are carboxylic acid groups. However, in some instances hydroxyl groups will serve equally as well to provide permanent final set of the inks. Examples of commercially available condensation polymerization resins suitable for use in the coating compositions of the invention which are rosin/maleic anhydride adducts condensed with polyols include:

a. Durez 19,788 and 15,546 resins which have molecular weights of about 720 and 1,000 and acid numbers of about 200 and 140 respectively. Additional Durez resins include: Durez 17,211 which has a molecular weight of about 950 and an acid number of about 150; Durez 23,965 which has a molecular weight of about 720 and an acid number of about 140, and Durez 23,971 which has an acid number of about 150; Durez resins are sold by Hooker Chemical Corporation.

b. Shanco L-1165 which has a molecular weight of about 600 and an acid number of about 190, Shanco L-1165S which has a molecular weight of about 600 and an acid number of about 190, Shanco 60-61 which has a molecular weight of about 650 and an acid number of about 210, Shanco L-1177 which has an acid number of about 200, Shanco 60-72 which has a molecular weight of about 720 and an acid number of about 200, Shanco 60-85 which has an acid number of about 190, Shanco 60-58 which has a molecular weight of about 660 and an acid number of about 215, Shanco 64-29 which has an acid number of about 195, Shanco L-1180 which has an acid number of about 180, Shanco L-1174 which has an acid number of about 140, Shanco 60-96 which has an acid number of about 193, Shanco 60-97 which has an acid number of about 198, Shanco 60-98 which has an acid number of about 188.5, Shanco 64-77 which has an acid number of about 167, Shanco 64-73 which has an acid number of about 200, Shanco 64-75 which has an acid number of about 202, Shanco 64-79 which has an acid number of about 204, and Shanco 64-23 which has an acid number of about 128. Shanco resins are sold by Shanco Plastics & Chemicals Inc.

c. Schenectady SR-88 which has a molecular weight of about 780 and an acid number of about 190, and Schenectady SR-91 which has an acid number of about 185. Schenectady resins are sold by Schenectady Chemicals Inc.

d. Alresat 618C has an acid number of about 180.

e Nelio VBR-7055 sold by the Glidden Company which has an acid number of about 200.

(Note: Where molecular weight is not stated, it is below about 5,000).

In addition to the condensation-type resins certain addition-type polymerization resins such as styrene/acrylic acid resins having molecular weights up to about 5,000 are useful. Styrene/acrylic acid resins having molecular weight from about 1,000 to about 4,000 are preferred.

Addition-type resins such as the styrene/acrylic acid resins discussed hereinbefore can contain up to about 25 mole percent of a modifying monomer such as: N-vinylpyrrolidone, diethylaminoethyl methacrylate, 2-methyl-5-vinylpyridine, acrylonitrile, methyl acrylate, butyl acrylate, 2-ethylhexyl acrylate, methyl methacrylate, and butyl methacrylate. These various modifying monomers can be represented by structural formulas such as:

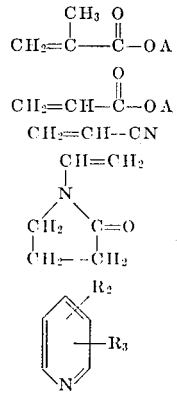

wherein A is an alkyl, aryl, alkaryl or substituted alkyl, aryl or alkaryl group and $R_2$ is a hydrogen or a methyl radical and $R_3$ is or vinyl radical.

Additional samples of commercial, low molecular weight rosin maleic resins are formulated into ink varnishes and tested for moisture setting characteristics. All of the varnishes contained 25 parts-by-weight resin, 25 parts-by-weight of tripropylene glycol, 10 parts-by-weight of hexamethoxymethyl melamine, and 2 parts-by-weight p-toluene sulfonic acid. The following table indicates the resins which were tested and found to give satisfactory drying characteristics in the process of the present invention.

TABLE

| Ex. No. | Resin Identification | M. W. | Acid No. | Manufacturer |
|---|---|---|---|---|
| VIII | Durez 15546 | 1000 | 140 | Hooker Chemical Co. |
| IX | Durez 17211 | 950 | 150 | Hooker Chemical Co. |
| XI | Durez 19788 | 720 | 200 | Hooker Chemical Co. |
| XII | SR 91 | <5000 | 185 | Schenectady Chemicals Inc. |
| XIII | SR 88 | 780 | 190 | Schenectady Chemicals Inc. |
| XIV | Unirez 7055 | <5000 | — | Union Camp Corporation |

It is to be noted that all of the resins set forth in the foregoing table have molecular weights in the vicinity of 700 to 5,000 as do the advantageous styrene-acrylic acid resins discussed hereinbefore.

While the configuration invention has been described in conjunction with advantageous embodiments, those skilled in the art will recognize that modifications and variations may be resorted to without departing from the spirit and scope of the invention. Such modifications and variations are considered to be within the purview and scope of the invention.

I claim:

1. A process of printing comprising depositing a moisture sensitive film of ink on a substrate, said film including a vehicle consisting essentially of a water-miscible solvent, a water-insoluble resin soluble in said solvent, a cross-linking agent for said resin selected from the group consisting of low molecular weight, water dispersible reaction products of aldehydes with ureas, phenols, melamine, ammeline and ammelide and etherified derivatives of said reaction products, etherified with low molecular weight monohydric alcohols, and an acidic cross-linking catalyst, said resin containing functional groups reactive with said cross-linking agent, contacting said deposited film with water to initially set said ink and thereafter allowing a permanent set of said ink to occur by reaction of said resin and said cross-linking agent.

2. A process as in claim 1 wherein said resin is an acidic resin.

3. A process as in claim 1 wherein said cross-linking agent is an etherified reaction pull-out of melamine and formaldehyde.

4. A process as in claim 3 wherein said cross-linking agent is hexamethoxymethyl melamine.

5. A process as in claim 1 wherein said resin is a copolymer of styrene and acrylic acid.

6. A process as in claim 1 wherein said water miscible solvent is a previously or glycol ether.

7. A process as in claim 1 wherein said acidic cross-linking catalyst is an organic sulfonic acid.

8. A process as in claim 7 wherein the organic sulfonic acid is paratoluene sulfonic acid.

9. A process as in claim 1 wherein the reaction to provide a permanent set of said ink is carried out at room temperature.

* * * * *

UNITED STATES PATENT OFFICE
CERTIFICATE OF CORRECTION

Patent No. 3,661,619          Dated May 9, 1972

Inventor(s) Aage Surland

It is certified that error appears in the above-identified patent and that said Letters Patent are hereby corrected as shown below:

Column 5, 3 lines from bottom, change "or"

to -- a --

Claim 3, line 2, change "pull-out" to

-- product --

Claim 6, line 2, change "previously" to

-- glycol --

Signed and sealed this 12th day of December 1972.

(SEAL)
Attest:

EDWARD M. FLETCHER, JR.          ROBERT GOTTSCHALK
Attesting Officer                Commissioner of Patents